United States Patent [19]

Friedman et al.

[11] 4,122,306
[45] Oct. 24, 1978

[54] TELEPHONE ANSWERING APPARATUS PROVIDING SELECTIVE MESSAGE COMMUNICATION

[76] Inventors: Jacob Friedman, 130 Clymer St., Brooklyn, N.Y. 11211; Sandor Goldner, 4308 10th Ave., Brooklyn, N.Y. 11219; Jacob Lax, 850 44th St., Brooklyn, N.Y. 11220

[21] Appl. No.: 634,402

[22] Filed: Nov. 24, 1975

[51] Int. Cl.² .................... H04M 1/64; H04M 1/65; G11B 15/02
[52] U.S. Cl. .................... 179/6 E; 179/6 R; 179/100.1 PS; 360/61; 360/63
[58] Field of Search ........ 179/6 R, 6 E, 6 C, 100.1 C, 179/100.1 PS, 100.1 VC, 2 A, 1 VC, 100.1 DR; 360/12, 61, 63, 78, 106, 72

[56] References Cited

U.S. PATENT DOCUMENTS

| | | | |
|---|---|---|---|
| 2,944,116 | 7/1960 | Vershoven | 179/100.1 C |
| 3,141,931 | 7/1964 | Zarouni | 179/6 C |
| 3,286,033 | 11/1966 | Lemelson | 179/6 E |
| 3,553,378 | 1/1971 | Alter | 11/11 |
| 3,649,762 | 3/1972 | Okamura | 179/6 R |
| 3,725,589 | 4/1973 | Golden | 179/6 E |
| 3,804,993 | 4/1974 | Honnold et al. | 179/100.1 PS |
| 3,829,616 | 8/1974 | Blouch | 179/2 A |
| 3,842,209 | 10/1974 | Foresta et al. | 179/6 E |
| 3,887,773 | 6/1975 | Urayama | 179/6 R |
| 3,937,893 | 2/1976 | Muller et al. | 179/6 R |
| 3,992,587 | 11/1976 | Puckett et al. | 179/2 A |
| 4,003,089 | 1/1977 | Maurer | 360/63 |
| 4,032,981 | 6/1977 | Arguellas | 360/69 |

FOREIGN PATENT DOCUMENTS

| | | | |
|---|---|---|---|
| 421,059 | 12/1934 | United Kingdom | 179/6 E |
| 901,173 | 7/1962 | United Kingdom | 179/6 R |
| 1,058,253 | 2/1967 | United Kingdom | 179/6 R |

*Primary Examiner*—Raymond F. Cardillo, Jr.
*Attorney, Agent, or Firm*—Friedman, Goodman & Teitelbaum

[57] ABSTRACT

A telephone answering system which can be interconnected to a telephone line and includes two tapes, one of which is utilized for recording incoming messages from the telephone line, and the other of which is used basically for playing outgoing messages onto the telephone line. The outgoing message tape includes a plurality of tracks each of which can be selectively placed in communication with the telephone line. A decoding apparatus is responsive to numerals dialed onto the telephone line by the caller with which the caller can select the particular track to be placed in communication with the telephone line and thereby receive the particular outgoing message contained on that track. By dialing an additional number, the caller can also change over the operation of the outgoing message tape to a record mode whereby he can utilize that tape for also receiving incoming messages from the telephone line and cause the message to be placed on a particular selected track.

26 Claims, 15 Drawing Figures

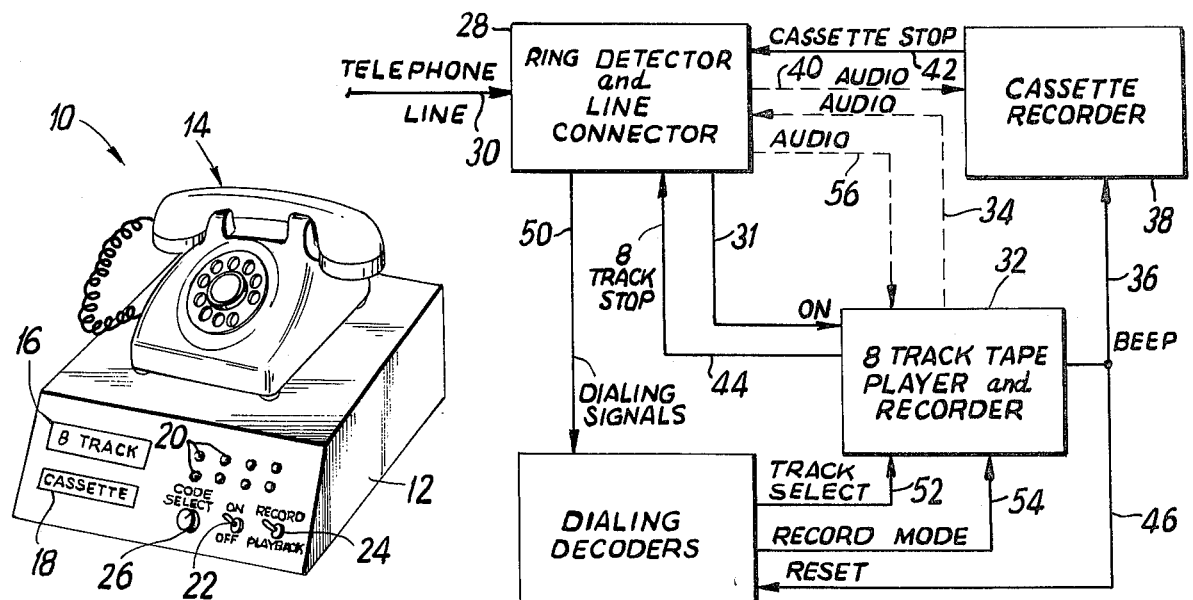
FIG. 1
FIG. 2
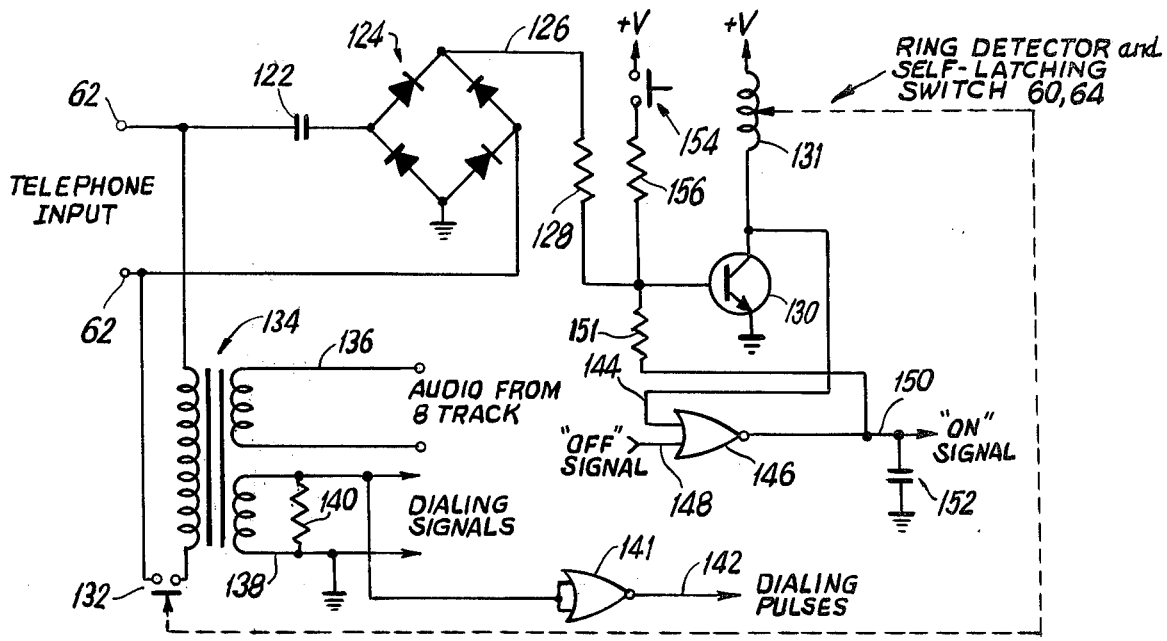
FIG. 4
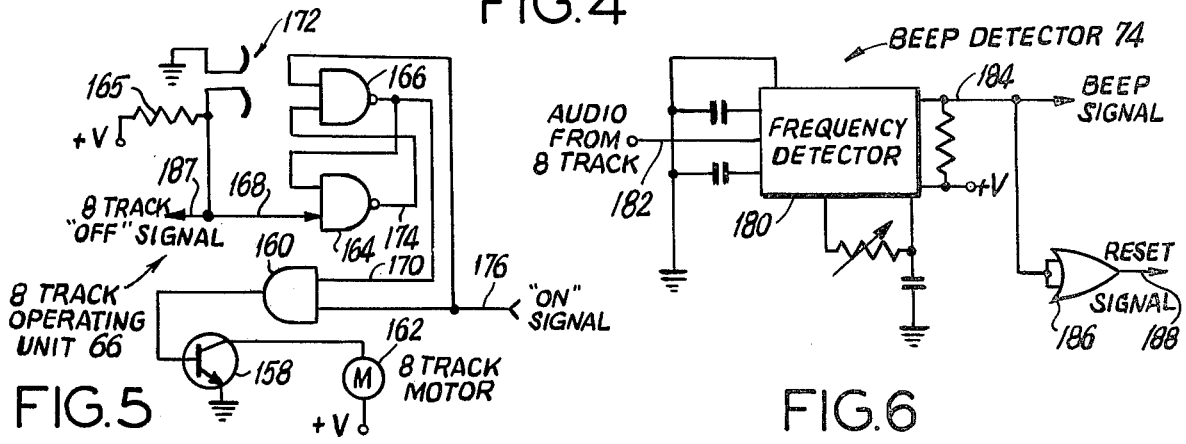
FIG. 5
FIG. 6

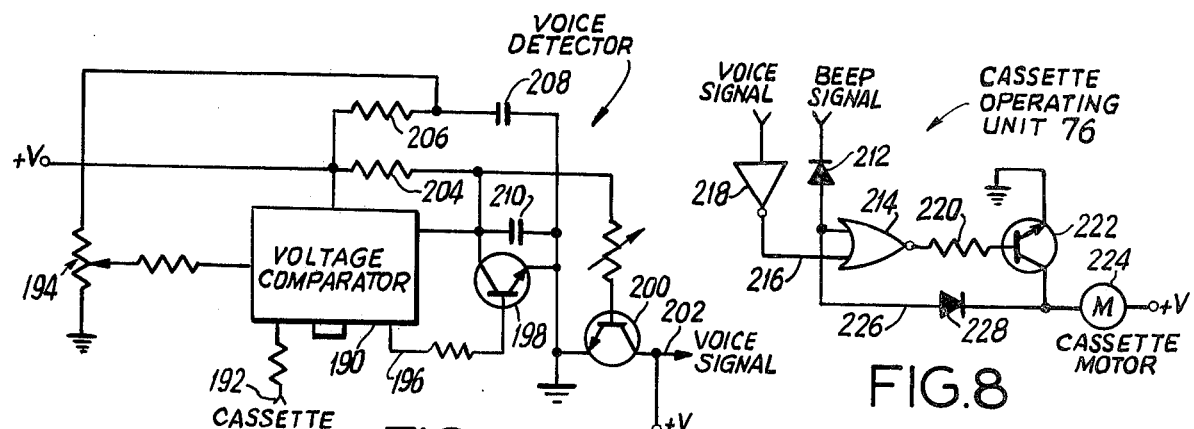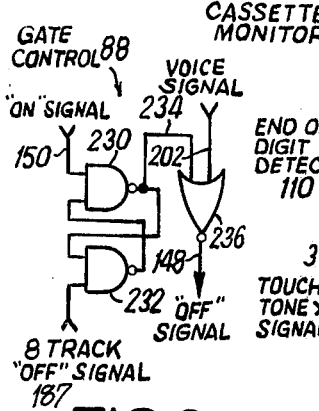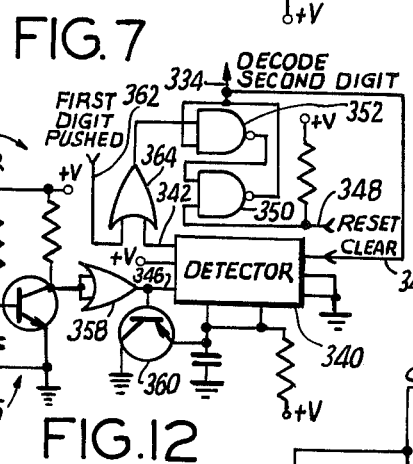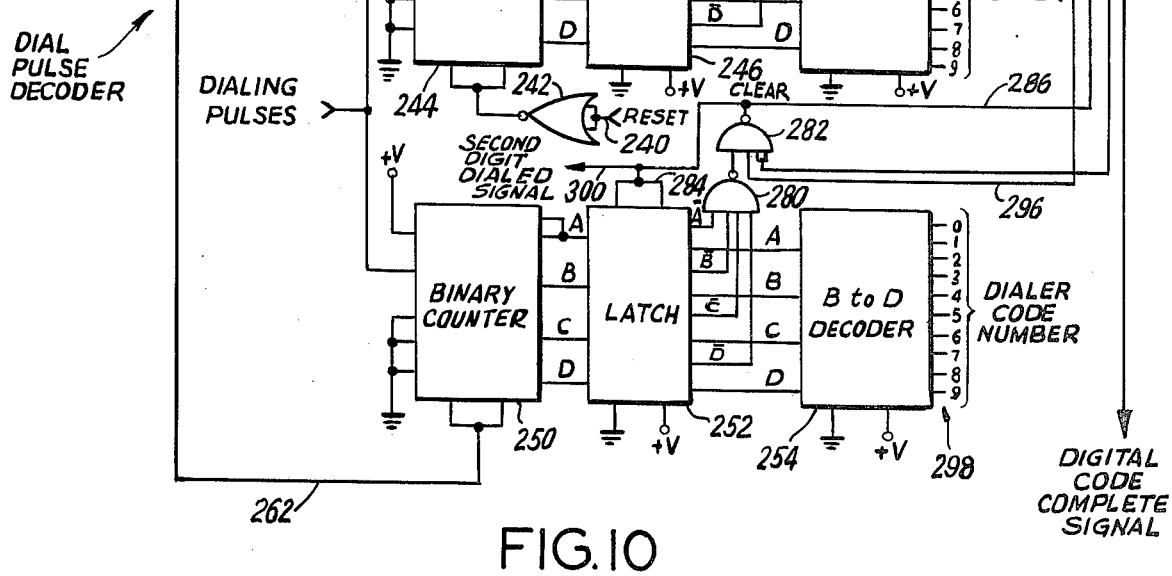

TELEPHONE ANSWERING APPARATUS PROVIDING SELECTIVE MESSAGE COMMUNICATION

BACKGROUND OF THE INVENTION

1. Field of the Invention

This invention relates to telephone answering systems and more particularly to such systems which can play outgoing messages as well as recorded incoming messages.

2. Description of the Prior Art

Telephone answering systems for interconnection to telephone lines are well known in the prior art. These systems operate as attachments to existing telephone handsets to automatically answer a telephone when the subscriber is unavailable or not present at the location. Most such telephone answering systems contain a prerecorded message which informs the caller of the absence of the subscriber and requests the caller to leave a message after the sounding of a particular signal, such as a beep. The telephone answering system records the incoming message as dictated by the caller and then releases the line to thereby "hang up" the telephone. Some more advanced telephone answering systems are voice operated, whereby there is no predetermined limit on the incoming message, but the voice control permits the caller to speak for as long as he wishes. After a caller has stopped speaking, the system will sense the absence of the voice and will release the line.

The owner, upon his return, can then rewind the tape stored in the telephone answering system and play back the recorded messages. Some telephone answering systems permit remote control by the owner, wherein, he can dial his own phone number and after the telephone answering system responds, the owner sounds a signal from a pocket unit which he must carry. The unit emits a frequency tone which is received by the telephone answering system and causes the telephone answering system to play back the messages recorded during his absence.

The prior art telephone answering systems are concerned with providing the capability of receiving messages left by various callers for the owner. However, a problem which has heretofore not been faced by prior art telephone answering systems concerns the capability of the owners leaving particular messages for various callers. For example, there are frequently occurring situations where the owner must leave the premises but wishes to leave messages for various people whom he knows will be calling in. He has no way of reaching the people and would desire to leave the messages on his telephone so that when they call in, each one will receive his particular message. With prior art systems, the owner could leave such a message as the outgoing message. However, each and every caller who would call the owner's telephone number would then receive the same message. This may be both embarrassing as well as inconvenient, and often the owner wishes that only the particular caller for whom the message is intended should be the one hearing the message.

Another situation which frequently occurs is in connection with a group of doctors, lawyers, or other professionals working together and having a common receptionist for taking messages. When the receptionist leaves the office, each person would like the capability of calling into his office and receiving only his messages; he has no desire to hear the messages being left for his colleagues. Frequently, as with doctors or lawyers, such messages may contain privileged information which should only be given to the particular professional and should not be heard by others. To achieve such individual message service in prior art systems, it was necessary for each individual to have a separate telephone number with a separate telephone answering system connected thereto and for him to call into his own telephone number to receive messages being left only for him. This, as can well be appreciated, results in an extremely costly and unnecessary duplication of equipment and apparatus.

Another frequent situation which occurs is in connection with individual families, where a parent which wants to leave messages for his children or other members of his family. With prior art systems, it was necessary to record the messages consecutively on the outgoing message tape. The caller would then have to listen to all of the messages, even though many of them did not relate to him. Still a further situation occurs with salesmen belonging to a single company who wish to leave messages for each other. The salesmen are frequently on the road and would like the capability of calling into a central telephone number and being able to direct a message to a particular other salesman without having every single member of the firm listen to the message.

While these are only some example, it becomes evident that telephone answering systems of the prior art have been extremely limited in their capabilities, by only providing the possibility of callers leaving messages for the owner. It is apparent that to be truly versatile and accommodating for all situations, a telephone answering system must also be able to store messages directed to particular callers and have the caller be able to receive his particular message without the burden of listening to all of the other messages.

In addition, such systems should also provide the capability of easily changing the individual messages from a remote location. For example, the owner may have to leave his office in a hurry and not have an opportunity to leave a message for a particular caller. Subsequently, when he remembers that he must leave such a message, the owner should be able to have the capibility of permitting the owner to call into his own telephone and have the telephone answering system record the messages for each particular caller. When the caller telephones the owner, the answering system will then be able to play the message for that particular caller. Also, the system should be able to provide the ability of having the caller leave a particular message to the owner in response to the owner's message, whereby others should not be able to listen to the caller's reply message but have it restricted to only the owner or, to a particular other caller, as desired.

Such capabilities, of course, can provide security, whereby only a particular caller will be able to receive his message and no other callers will be able to intercept or intervene with that message. Such security capabilities are frequently important in industrial use and professional activities, as well as individual family use where information may be desired to be restricted from certain members.

SUMMARY OF THE INVENTION

It is accordingly an object of the present invention to provide an improved telephone answering system which avoid the aforementioned problems of prior art devices.

It is a further object of the present invention to provide a telephone answering system which can both receive incoming messages as well as store outgoing messages for particular callers.

Still another object of the present invention is to provide a telephone answering system which permits the owner to leave individual messages to selected callers, whereby only the intended caller will receive his message.

Yet another object of the present invention is to provide a telephone answering system which includes two tapes, one of which is utilized as a standard recording tape for incoming messages and the other of which contains a plurality of tracks, each of the tracks being selectable by a particular assigned caller.

Still another object of the present invention is to provide a telephone answering system wherein the caller can select a particular portion of the tape assigned to him by dialing in preassigned numbers.

A further object of the present invention is to provide a telephone answering system which can decode numbers dialed by a caller onto the telephone line after a given signal.

Still a further object of the present invention is to provide a telephone answering system which utilizes the dialing system of the caller's telephone as a remote control for the answering system.

Yet a further object of the present invention is to provide a telephone answering system including a plural track tape wherein a particular track can be selected by the dialing of telephone numbers onto the telephone line, and the record/playback operation of the tape can also be controlled by dialing a telephone number onto the telephone line.

Still a further object of the present invention is to provide a telephone answering system which provides a standard outgoing message followed by a beep signal, which then activates a decoding circuit to permit the caller to dial numbers onto his telephone set, thereby selecting his particular message designed for him.

Yet a further object of the present invention is to provide a telephone answering system which can be controlled by the dialing of numbers onto the caller's telephone handset and wherein the system can decode both rotary dialed numbers as well as Touch-Tone dialed numbers.

A further object of the present invention is to provide a telephone answering system which can accommodate a first tape for incoming messages and a second tape having a plurality of outgoing messages designed to be selected by the caller, and wherein the answering system will not release the line until both tapes have completed their respective operations.

Still a further object of the present invention is to provide a telephone answering system wherein individual tracks of a tape can be selected by the dialing of predetermined code numbers on the caller's telephone handset, and wherein the code can be easily changed by the owner of the system.

A further object of the present invention is to provide a telephone answering system which provides a plurality of outgoing messages, each assigned to a particular caller, and which includes security devices to prevent an unauthorized caller from receiving a particular message assigned to another.

These and other objects, features and advantages of the invention, will, in part, be pointed out with particularity, and will, in part, become obvious from the following more detailed description of the invention, taken in conjunction with the accompanying drawings, which form an integral part thereof.

Briefly, the invention describes a telephone answering system for interconnection to a telephone line. The system includes coupling means which seizes the telephone line in response to an incoming telephone call. A first recording means is operatively connected to the coupling means and plays an outgoing message onto the telephone line after the line has been seized. A second recording means responds to the conclusion of the outgoing message, and thereafter records incoming messages from the telephone line. A control means interconnects both of the recording means with the coupling means for releasing the telephone line only after both recording means have concluded their respective operations.

In one embodiment, the first recording means operates a plurality of recording tracks with the outgoing messages being recorded on one of the tracks. A decoding means is interconnected to the telephone line through the coupling means and decodes numbers dialed onto the telephone line by the caller after the conclusion of the outgoing message. A track selection means is coupled to the decoding means and selects a particular one of the recording tracks which corresponds to the decoded number. The selected track is then placed in communication with the telephone line whereby any message recorded on the selected track is played onto the telephone line.

In another embodiment, the system includes record detecting means coupled between the decoding means and the first recording means for detecting a particular decoded number. In response to receiving the particular decoded number, the record detecting means switches the first recording means to a record mode whereby incoming messages can be recorded on the particular recording track selected.

By way of example, the first recording means can be a dual-channel, plural track recording tape, and the second recording medium can be a standard cassette recording tape.

BRIEF DESCRIPTION OF THE DRAWINGS

In the drawings:

FIG. 1 is an isometric view of the telephone answering system of the present invention in association with a telephone handset to which it is coupled;

FIG. 2 is a block diagram explaining the general operation of the telephone answering system of the present invention;

FIG. 4 is a detailed circuit diagram showing the ring detector and self-latching switch;

FIG. 5 is a detailed circuit diagram of the 8-track operating unit;

FIG. 6 is a circuit diagram showing the beep detector;

FIG. 7 is a circuit diagram showing the voice detector;

FIG. 8 is a circuit diagram showing the cassette operating unit;

FIG. 9 is a circuit diagram showing the gating control circuit;

FIG. 10 is a circuit diagram showing the dial pulse decoder system;

FIG. 12 is a circuit diagram showing the end-of-digit detector for the Touch-Tone decoder;

In the various figures of the drawing, like reference characters designate like parts.

DESCRIPTION OF THE PREFERRED EMBODIMENT

Figure 3:
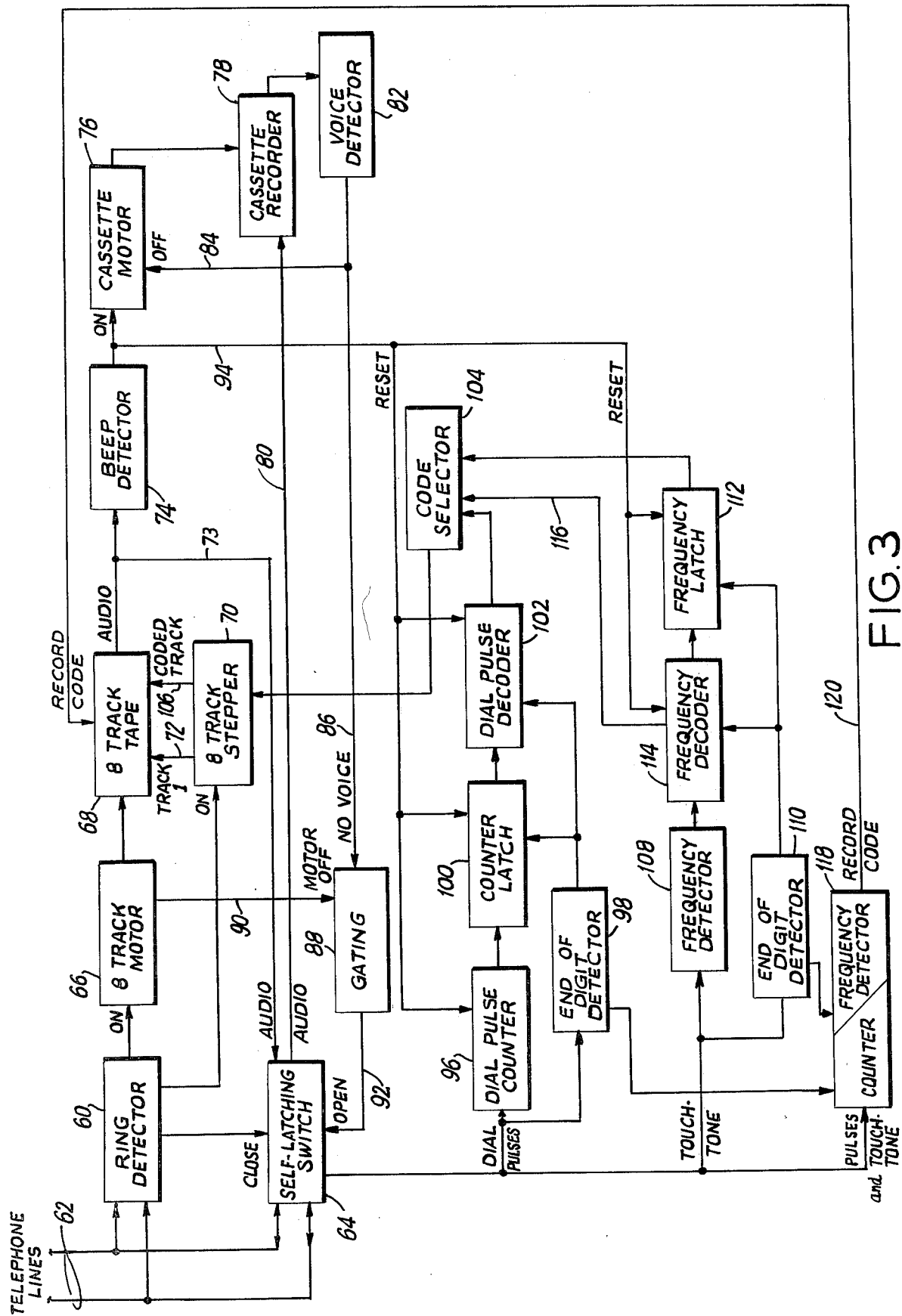
FIG. 3 is a detailed block diagram showing the operation of the telephone answering system in accordance with the present invention.

Referring now to FIG. 1, there is shown the telephone answering system of the present invention 10 contained within a housing 12 and positioned with respect to a telephone handset 14. The telephone answering system would be interconnected to the telephone line either directly within the telephone handset, or at the outlet extension to which the handset is connected. On the face of the housing 12 there are two openings 16, 18 through which tapes can be inserted. Opening 16 is available to slide in an 8-track tape, while opening 18 is available for insertion of a cassette. Other types of openings for insertion of the tapes could be utilized, as is well known in the art. On the front of the housing are located a plurality of bulbs 20 each of which is associated with one of the 8 tracks on the 8-track tape. These bulbs could be light emitting diodes, liquid crystals, incandescent bulbs, or other electroluminescent devices. The bulbs light up to indicate which of the 8 tracks is being utilized. Also positioned on the housing 12 is a main on-off switch 22 which serves to energize the telephone answering system and make it operative. A "record/-playback" switch 24 is also located on the housing whereby the owner can initially record messages onto the telephone answering system or subsequently play back the recorded messages. A code select knob 26 is available for the owner to choose which of a plurality of codes should be associated with each of the 8 tracks. By changing the code select switch he can modify the correspondence between a particular code and a particular track so that he can thereby effectively increase the numbers of callers who have their own individual track, and can also add a degree of security to the system by constantly changing the codes thereby confusing unauthorized callers and individuals who try to intercept messages.

Although the telephone answering system 10 is shown positioned beneath the telephone handset, it is understood that it can be positioned in a location separate from the telephone handset, and it need only be interconnected to the telephone line which feeds the telephone handset.

The operation of the telephone answering system in accordance with the present invention can generally be understood in connection with the block diagram shown in FIG. 2. The telephone answering system includes a ring detector and line-connector 28 which is interconnected to the telephone line 30 which feeds the telephone handset being automatically answered. When a telephone call arrives at the handset, the telephone line carries an alternating voltage representing an AC ring on the line. The ring detector detects the telephone ring, and in response thereto, causes the line-connector to seize the telephone line, thereby effectively answering the telephone call. The line-connector is a self-latching switch so that after the ring ceases, the lines will remain seized to permit incoming and outgoing messages to be placed onto the telephone line.

When the line has been seized, a signal is sent on line 31 to an 8-track tape player and recorder 32 which turns on the player and switches it to a first track where an initial outgoing message has been recorded. Typically, the message informs the caller of the absence of the owner and provides instructions for the caller how to leave messages. The audio outgoing message will pass along line 34 through the line-connector 28 to the telephone line 30.

At the conclusion of the initial outgoing message, there is generally provided a signal to the caller indicating that he may now commence recording of his messages. Typically such signal includes a "beep". The beep signal, in addition to providing an indication to the caller, is also used in the present system to commence operation of additional circuits. The beep on line 36 causes a cassette recorder 38 to commence operation. Audio incoming messages from the telephone line can now be recorded on the cassette recorder 38 along line 40. Cassette recorder 38 is voice controlled whereby, as long as voice is present on line 40 the cassette continues to operate. The cassette-recorder 38 will detect the absence of the voice and if such absence persists for a predetermined length of time, it will then automatically stop the cassette from operating and send a cassette stop signal to the line-connector 28 along line 42. The 8-track tape is typically a short endless tape having an indication thereon when a complete cycle has been concluded on the endless tape. After the 8-track tape has provided its outgoing message, the 8-track tape will continue to operate until a complete cycle has been completed on the endless tape and a signal is generated to stop the 8-track tape from operating. The 8-track stop signal is also sent to the line-connector on line 44. When both the cassette stop signal on line 42 and the 8-track stop signal on line 44 are present, there is provided an indication that both the cassette and the 8-track tapes have stopped operating and only then will the line-connector open and release the telephone line thereby effectively "hanging up" the telephone and permitting subsequent calls to arrive.

With the aforedescribed circuit, the telephone answering system of the present invention provides an outgoing message to the caller and can receive and record incoming telephone messages from the caller. The outgoing message is contained on one track of the 8-track tape, and the incoming messages are recorded on the cassette tape.

The telephone answering system in accordance with the present invention also provides the capabilities for the owner leaving selective messages to selected callers. Because of the availability of selecting a particular track on the 8-track tape, it is possible for the owner to assign a particular track to a particular caller. When the particular caller calls the telephone number, after receiving the standard outgoing message, he can then dial his code which will select his particular track on the 8-track tape and cause the pre-recorded message on that selected track to be played. In this manner, the individual caller can hear a selected message meant only for him.

In order to select the particular track, at the conclusion of the standard outgoing message, the beep signal on line 46 resets dialing decoders 48. After the beep signal, instead of placing a message on the telephone line, the caller dials preselected numbers on his own telephone unit. These numbers will be sent over the telephone line and be received by the telephone answering system along line 50. The code number dialed by the caller, will be decoded by the decoder 48 to determine the particular track associated with the decoded numbers. For example, the track number 4 can be preassigned code numbers "76". After hearing the beep signal, the caller will dial the two numbers "76" on his own telephone unit. These numbers will be received by the decoder 48 and will be decoded to provide a track select signal on line 52 which corresponds to track 4. The track select signal will cause the 8-track tape player and recorder 32 to step until track 4 is placed in communication with the telephone line and then the audio message contained on track 4 will pass along line 34 onto the telephone line to be heard by the caller.

With the aforegoing described system, separate messages can be recorded on each of the tracks and the code number associated with each track can be given to particular callers. A caller need only know his particular code number to select his individual track. In this manner, the owner can leave separate messages on each of the tracks and the callers will only be able to hear their own message on their particular track after dialing in his code numbers. The caller will not hear any of the other messages since he will not know the code to select any of the other tracks.

Should the owner be away from the telephone answering system and should he desire to change one of the messages on a particular track, or if the owner has left the premises neglecting to leave a message and subsequently remembers that he was supposed to leave such a message, he can remotely record a message on any of the individual tracks. The owner simply dials the telephone number which causes the telephone answering system to seize the line. After the standard outgoing message, the beep signal will occur. The owner then dials the code of the particular track on which he decides to leave a message. The decoder will cause the particular track to be placed in communication with the telephone line. However, at this point the owner dials an additional code indicative of a changeover operation from playback to record. The additional code is also decoded by the decoder 48 and causes a record mode signal on line 54 to change the operation of the 8-track tape from a playback mode to a record mode. The owner can recite his message on whatever telephone unit he is utilizing. The message will be transmitted over the telephone line and passed from line 56 to the 8-track tape 32. In this way, the owner can pick any of the tracks and remotely record a message on that track for the caller who will subsequently call to receive the message. When the owner hangs up, the 8-track tape player and recorder will automatically change back to its playback mode so that the subsequent caller will be able to receive the message.

Utilizing the arrangement of the present telephone answering system, it is also possible to have one caller leave a message for another caller as long as he knows the code of the other caller's track. For example, the caller whose assigned track is track 4 can also leave a message for the caller whose track is track 3. The track 4 caller simply calls the telephone number and instead of dialing the code to select his own track 4, he dials the code to select track 3 and then dials in the additional code to change the operation from playback to record. He can then leave a message for the track 3 caller. In this manner, the telephone answering system provides an intercommunication system for the various callers who have tracks within the system.

Additionally, by making the length of the endless tape of the 8-track tape longer, it is possible to include an outgoing message on each track, and at the same time, provide sufficient room for the caller to leave a reply message on his own track. In this manner, the caller can dial into the system and after the beep can dial his code to select his track. After hearing the outgoing message directed to him, he can then dial the additional code to change the mode of operation from playback to record and he can then record a message on his track for the owner. It is understood that as he will record on his own track, the cassette recorder will also receive the incoming message and record it on the cassette tape. This will then provide two ways for the owner to pick up his messages; either by listening to the continuous cassette thereby receiving all the messages sequentially, or by listening to each individual track and selecting which message he wishes to hear. Furthermore, the cassette will assure that the caller can leave a very long message so that even if the portion of the 8-track tape should run out, his message is still recorded on the cassette.

The dialing decoder 48 will be able to decode both pulses dialed onto a telephone handset rotary dialer as well as frequencies transmitted as a result of using a Touch-Tone dialing system. Furthermore, the decoders can include a code selector whereby the owner has the option of changing the code associated with a particular track. For example, on a given day he can assign code "76" to track number 4. He can then change the arrangement whereby a different code, for example "24", will be assigned for the same track number 4. With this code select arrangement the owner will be able to use the same track for more than one caller by giving one caller one code for the track, and a different caller a different code for the same track. Should he want to leave a message for the first caller, he will dial the code selection whereby the code "76" will select track 4 and that caller will receive the message. The second caller dialing his code "24" will not be interconnected to any track and he will know that no message has been left for him. Should the owner want to leave message for both callers, he can simply reassign code "24" to select a different track, for example track number 3. Since the callers have no way of knowing which track their code receives, so long as the owner identifies the code with a corresponding track, he can utilize the 8 tracks for even more than 8 callers.

Referring now to FIG. 3, there is shown a more detailed block diagram indicating the operation of the telephone answering system in accordance with the present invention. A ring detector 60 is connected to the telephone lines 62 and upon receiving the ring of an incoming call will cause the self-latching switch 64 to close thereby seizing the telephone line and answering the call. The self-latching switch 64 will remain closed until both the cassette and 8-track tapes have ceased operating, as will hereinafter be explained. The ring detector also sends a signal to the 8-track operating unit 66 including the 8-track motor which causes the 8-track tape 68 to begin playing. The ring detector also signals the 8-track stepper unit 70 to position track 1 of the 8-track tape in communication with the telephone line. The track 1 signal 72 is sent to control the 8-track tape unit 68.

The 8-track tape will then play the standard outgoing message contained on track 1. The message will be played onto the telephone line along 73 and will be heard by the caller. At the conclusion of the outgoing message, a beep signal will occur indicating the caller may now recite his message. The beep will also be heard by a beep detector 74 which will cause the cassette operating unit 76 to turn "on" thereby energizing the cassette motor to operate the cassette recorder 78 whereby the incoming message on line 80 will be now recorded onto the cassette recorder. As long as the message continues, the voice detector 82 will maintain the cassette recorder in operation. When the caller has stopped speaking, the voice detector 82 will sense the absence of the voice and will send a signal on line 84 to stop the operation of the cassette motor. At the same time, the voice detector 82 will send a signal on line 86 to a gate control circuit 88.

The 8-track tape will continue to operate until it has concluded a complete cycle of operation, and then the 8-track motor will stop. When the 8-track motor 66 stops, it also sends a signal along line 90 to the gate control circuit 88. When both the 8-track motor Off signal on line 90 as well as the cassette motor Off signal on line 86 are received by the gating 88, it sends a signal on line 92 to open the self-latching switch 64 which releases the telephone line.

When the beep detector 74 detects that the outgoing message on the first track of the 8-track tape has been concluded, it also sends a reset signal on line 94 to reset the dialing decoder and the Touch-Tone decoder. After hearing the beep, if the caller wishes to receive his particular message he then dials his preassigned code onto his telephone unit. The dialing pulses are received from the telephone line 62 by means of the dial pulse counter 96 which counts the number of pulses present. As is well known, telephone pulses continue at a fixed predetermined rate of approximately 10 cycles per second. The end-of-digit detector 98 also receives the dial pulses, and when it senses the absence of one of the cyclic pulses, it notes the end of a digit dialed and sends a signal to the counter latch 100 to maintain the count of the dial pulse counter. The dial pulse decoder 102 then decodes the count which has been latched and sends a signal to the code selector 104. The code selector 104 has been preset to provide a series of correspondences between the decoded pulses and a particular track of the 8-track tape. A signal is then sent to the 8-track stepper 70 indicating which coded track has been selected and the stepper will send a signal on line 106 to the 8-track tape to cause the selected track to be placed in correspondence with the telephone line.

The message coded on the selected track will then pass on line 73 through the switch 64 onto the telephone line 62 to be heard by the caller. At the conclusion of the operation of the 8-track tape, a signal will again be sent through the gate unit 88. If no incoming message is present, the cassette motor will have shut off which will now cause the self-latching switch 64 to close and the telephone lines be released.

Should the caller be utilizing a Touch-Tone telephone, upon hearing the beep signal he will dial the encoded number using the Touch-Tone telephone. The Touch-Tone system is a multi-frequency dialing system having two different frequencies associated with each dialed digit. The frequencies placed on the line by the caller are received by the frequency detector 108. The end-of-digit detector 110 for the Touch-Tone decoder will sense the end of a digit being dialed after it has received the first two simultaneously occurring frequencies. It will then send an indication to the frequency latch 112 to retain the frequencies which have been decoded by the frequency decoder 114 to determine the associated number dialed. The frequency decoder will then send a signal to the code selector 104 along line 116. The code selector will again provide the correspondence between the decoded number and the desired track and will cause the 8-track stepper 70 to place the associated track in communication with the telephone lines.

After the code to select a particular track has been dialed, the caller may then dial an additional code which will cause the 8-track unit to change from playback to record. At the end of the digits making up the track select code, both end-of-digit detector 98 for the dial pulse decoder, and the end-of-digit detector 110 for the Touch-Tone decoder, sends signals to a counter-and-frequency-detector 118. These signals enable the counter-and-frequency-detector and, should a preselected code number be dialed on to the telephone lines, whether it be pulses or Touch-Tone, the unit 118 will permit that number to pass. If pulses were dialed, the counter will count those pulses to determine if it is the preassigned code. If it is a Touch-Tone number, the frequency detector will detect the frequencies to determine if it is the preassigned code. Should such code be received, it will signal along line 120 to the 8-track tape 68 to reverse its operation and now place it in a record mode.

Audio from the telephone lines will now be able to pass along line 73 into the 8-track tape on the particular selected track to record a message thereon. At the end of the operation of the 8-track tape, and when the cassette motor also stops, the signal will pass through the gating control 88 to permit the self-latching switch 64 to release the telephone lines.

Referring now to FIG. 4 there is shown a detailed circuit of the ring detector and self-latching switch, 60 and 64. When a telephone ring announces an incoming telephone, the ring passes through blocking capacitor 122 to be rectified by the full wave rectifier 124. The output on line 126 is therefore a DC signal which passes through the base resistor 128 to turn on the transistor 130. The transistor then conducts the current from the voltage source +V connected to its collector and passes it to ground through its emitter. This current will energize the relay coil 131 which will cause the relay switch 132 to close. Closing of a normally opened relay switch 132 seizes the telephone line and thereby answers the phone. It also places the transformer 134 in parallel across the input to be able to receive and transmit audio information from the telephone line. The audio from the 8-track will be provided across the secondary 136. This secondary will also be utilized to record audio information on to both the 8-track and the cassette. Dialing signals will be sent across the secondary 138 which includes a resistor 140 in parallel. The dialing pulses will first be sent through NOR gate 141 serving as a pulse shaper so that the output at 142 are clean and sharp dialing pulses which can subsequently be decoded.

In order to insure that the line remains answered after the ringing stops, when the transistor 130 is first turned on a low signal is provided on line 144 to the input of gate 146. So long as the signal on 148 also remains low, the output of the NOR gate 146 on line 150 will be high, which will keep on the transistor 130 through the resistor 151. The high signal on line 150 is also utilized as an "On" signal for other parts of the circuit. A capacitor 152 delays the signal on line 150. When an "Off" signal, represented as a high on line 148 arrives, it will give a low output on line 150 which will turn off the transistor 130 thereby deenergizing the relay coil 131 and permitting the relay switch 132 to open, releasing the telephone lines. The "Off" signal on 148 will only be provided when both the cassette and the 8-track have stopped operating, as will hereinafter be explained.

A manual switch 154 is also provided to turn on the unit. Manual switch 154 interconnects the base of the transistor 130 with the voltage supply +V across the resistor 156 to turn on the transistor 130 and produce the same result as a ring on the telephone line.

Referring now to FIG. 5 there is shown the 8-track operating unit 66. When the telephone has been answered, the "on" signal on line 176 becomes high and turns on the transistor 158 through the AND gate 160, since the other input to the AND gate 160 is a normally high signal. The current can now pass from the voltage supply +V through the 8-track motor 162 and through the transistor 158 to ground. This energizes the 8-track motor and permits it to operate the 8-track tape.

An 8-track tape generally consists of a plurality of tracks positioned one above the other. Each track usually has dual-channels representing the right and left amplifier output. The tape consists of an endless belt with a metallic strip through the middle. The strip is therefore transverse to the endless tape. A tape sensor 172 contains two metallic contacts spaced apart and positioned at opposite ends of the metallic strip of the endless tape. After a complete cycle of the 8-track tape, the metallic strip will interconnect the two ends of the tape sensor.

In FIG. 5, before the line is seized, the "ON" signal is low causing the output of NAND 166 to be a low and the output from NAND 164 to be a high. The output from AND 160 will be a low and the transistor 158 will be off so that the motor 162 will not operate. When the line is seized, the "ON" signal will become high and the output from AND 160 is a high to turn on transistor 158 which causes the motor 162 to operate. During the normal operation of the 8-track tape, the voltage from the high voltage supply +V will pass through the resistor 165 to NAND gate 164 giving a low output from NAND 164 on line 174 which insures that the output of NAND 166 will be a high to keep the motor operating. However, when the tape sensor 172 is shorted to ground sensing the end of a complete cycle of the 8-track tape, it will ground the voltage and produce a low input to NAND 164 which will cause the output of NAND 164 to be a high and the output from NAND 166 to be a low which will make the output of AND 160 a low and turn off the transistor 158 thereby stopping the 8-track motor 162. It will be appreciated that even if the caller hangs up his telephone, the "on" signal remains high until it is changed by the circuit of FIG. 9, to be hereinafter described. However, at the same time, with the circuit of FIG. 5, should the cycle of the 8-track tape be completed, even if the caller keeps the line open, the 8-track will stop and will not start again until after the "on" signal changes to a low, which would only occur after the call has been completed and the line released.

Utilizing the circuit of FIG. 5 it will therefore be noted that after the telephone line is seized by the self-latching switch, the 8-track motor will begin to operate and will continue operating until after a cycle of the 8-track tape has been completed whereupon the motor will automatically stop. The stopping of the motor will also provide an 8-track Off signal 187 which will hereinafter be utilized.

As will hereinafter be explained, when the "On" signal becomes high, indicating the answering of the telephone line, the 8-track stepper will position the first track in communication with the telephone line so that a prerecorded standard outgoing message will be played onto the telephone line. At the conclusion of the outgoing message, a signal, such as a beep, will be heard. The beep indicates the end of the outgoing message and will serve to turn on the cassette. The beep will be detected by a beep detector, whose circuit is shown in FIG. 6. The beep is typically a signal at a predetermined frequency and a frequency detector chip 180 is utilized as the basic part of the beep detector. The necessary capacitors and resistors are preset so that the frequency detector unit will detect the particular frequency of the beep. Typically, the frequency detector can be a IC chip number 567. The input to the circuit 180 is on line 182 which contains the audio from the 8-track tape. When a beep is detected, the circuit 180 produces an output beep signal on line 184. This signal will be utilized to turn on the cassette motor. At the same time, the beep signal passes through an OR gate 186 to provide a reset signal 188 which will be utilized by the dialing decoder and the Touch-Tone decoder, as will hereinafter be explained.

Interconnected to the cassette is a voice detector 82, whose circuit is shown in FIG. 7. The voice detector includes a voltage comparator integrated circuit chip 190, as for example chip LM 311. The input enters along line 192 from the monitor jack of the cassette. The voltage resulting from the audio is comjared with a voltage from the variable resistor unit 194, 206 and capacitor filter 208. As long as voice is present on the input 192, the voltage will be greater than the threshold voltage on the resistors 194 and a high output will be present on line 196. The high output on 196 turns on the transistor 198 which shorts the voltage supply to ground through the transistor 198 to keep the transistor 200 in an off state, whereby the output on line 202 will be a high from the voltage supply indicating the presence of a voice signal. On the other hand, in the absence of a voice signal, output 196 will be a low value which will turn off the transistor 198 thereby causing transistor 200 to be on and the voice signal on line 202 to be a low. The voltage comparator 190 includes a delay circuit comprising the resistors 204, and the capacitors 210 to give a delay time after the absence of a voice signal is detected, before turning on the transistors. Many times a caller will hesitate in his message and there will occur a slight delay in his speech, although he has not actually terminated the message. The delay network will prevent the cassette from turning off until there exists the absence of voice for a sufficient length of time, to make sure that the caller has completed his entire message.

Referring now to FIG. 8 there is shown the circuit for the cassette operating unit 76. When the outgoing message from the first track of the 8-track unit has concluded, a beep signal will be provided along line 184, as shown in FIG. 6. Line 184 normally provides a high voltage output. However, upon detection of the beep, a low pulse is present. The presence of the low pulse will pass through the reverse diode 212 and provide a low input to the NOR gate 214. The other input to NOR gate 214, along line 216, is the voice signal from the voice detector, which passes through the inverter 218. The voice detector (shown in FIG. 7), in addition to detecting the voice of the caller during an incoming message also detects the sound of the beep to produce a high output signal on line 202 (FIG. 7). This high on the line 202, representative of the beep, will pass through the inverter 218 in FIG. 8 providing a low input on line 216. With both inputs to the NOR gate 214 being low, the output from the NOR gate will be a high which will pass through resistor 220 to turn on the transistor 222 thereby permitting voltage to pass through the cassette motor 224 and through the transistor 222 to ground thereby turning on the cassette motor which will operate the cassette tape.

After the beep signal has passed, the beep signal again turns to a high. However, the high is now blocked by the reverse diode 212. On the other hand, the line 226 is now a low which can pass through the reverse diode 228 to maintain one input of the NOR gate 214 at a low value. The other input on line 216 is, of course, controlled by the presence or absence of voice. When the caller recites his incoming message, the line 216 will be a low and the cassette motor will continue to operate since the NOR gate 214 provides a self-latching switch for the transistor 222 and keeps it in an ON state. However, when the caller stops speaking, the voice detector will sense the absence of the voice and after a predetermined time delay the voice signal on line 202 (FIG. 7) will return to its normally low state, whereby the input to NOR gate 214 on line 216 will become a high so that the output from NOR gate 214 will be a low thereby turning off the transistor 222 and stopping the cassette motor 224.

Referring to FIG. 9 there is shown the gate control circuit 88 which provides the signal to turn off the telephone answering system. When the telephone line is initially seized, the "on" signal on line 150 becomes a high. This is applied to the NAND gate 230. The seizing of the telephone line also causes the 8-track to become operative so that the 8-track "off" signal 187 applied to NAND gate 232 is also high. As a result, the output of NAND gate 232 will be low and the output of NAND gate 230 will be high. The output from NAND gate 230, on line 234, is applied as one of the inputs to NOR gate 236. With a high input, the output of NOR gate 236 on line 148 will be low. This low signal is applied to the self-latching switch, shown in FIG. 4, so that the self-latching switch will remain operative and the telephone line will remain seized.

When the 8-track tape has completed its cycle, the 8-track off signal 178 becomes a low. The output of NAND gate 232 will become a high, so that both inputs to NAND gates 230 are high and the output of NAND gate 230 on line 234 will now be a low. However, the output from NOR gate 148 will still be a low. When the voice detector senses the absence of a voice signal, it will stop the operation of the cassette motor and the voice signal on line 202 will then become a low. The presence of both lows at the input to the NOR gate 236 will now make its output high so that the off signal on line 148 applied to the self-latching switch will be high, which causes the self-latching switch to open and the telephone line to be released.

It will therefore be evident, that utilizing the gate control shown in FIG. 5, the telephone answering system of the present invention will only release the telephone line when both the 8-track and the cassette have both stopped operating. This insures that the incoming message has been completed and also insures that the 8-track has rewound to its initial position so that when a subsequent telephone call will be received the 8-track will be ready to commence the standard outgoing message at its very beginning.

Utilizing the circuits heretofore described, the operation of the telephone answering system of the present invention will be as follows. When the caller dials the number, the telephone line will be seized and will self-latch into a seized state. The 8-track tape will be positioned so that its first track with its standard outgoing message is in communication with the telephone line and the 8-track motor will operate. At the conclusion of the outgoing message, a beep signal will be detected by both a beep detector and a voice detector which will serve to turn on the cassette motor permitting it to record incoming messages. As long as the incoming message continues, the cassette will record. Following the absence of an incoming message, and when the 8-track has finished its complete cycle of operation, the telephone answering system of the present invention will release the telephone line and be ready to answer the next telephone call.

Should the caller desire to receive a particular message on his assigned track, then, following the beep signal, he would dial his predetermined code number, representing the track, directly onto his telephone. If the caller is dialing from a rotary dialer, the dial pulse decoder shown in FIG. 10 will be utilized by the telephone answering apparatus to decode the numbers dialed.

The beep signal produced by the beep detector, also provides the reset signal on lines 240 and 244. When the beep is detected, it produces a low signal so that the reset signal on line 240 is also a low signal and when applied to the NOR gate 242 produces a high output which resets the binary counter circuit chip 244. Typically, this chip can be a 7490 type chip and the voltage supply and ground connections are as indicated. The outputs from the binary counter 244 are binary signals taken along lines ABCD and are normally at low levels. The signals pass througe the latching circuit chip 246 which can typically be IC chip 7475. For each input, the latching chip produces a normally low output which is identical to the input, as shown by lines ABCD as well as an inverse output which is normally high, shown by lines ABCD. The normal outputs from the latch 246 pass to the binary-to-decimal decoder chip 248, which can typically be a 7445 chip. The decimal outputs of the decoder 248 are normally high.

If two digits are to be utilized for the code, a second binary counter 250, interconnected to a second latch 252, with a second binary-to-digital decoder 254, will also be provided, and will operate in parallel with the first group of similar circuits.

The inverse outputs from the latch 246 will initially all be at a high value and will feed into the NAND gate 256 so that the output of NAND gate 256 is a low value.

This output feeds another NAND gate 258, and as long as the output from 256 will be a low value, the output from gate 258 will necessarily be a high value. The high value at the output of gate 258 is fed to latch 246 along line 260 to hold the latch 246. It is also fed at 262 to the second binary counter 250 to hold the binary counter at zero. The high output from the NAND gate 258 is used as a clear signal on line 264 to the end-of-digit detector which includes the missing pulse detector 266. The pulse detector 266 can typically be an IC chip 74123. The output from the pulse detector 266 on line 268 is normally high. When a high value is present on the clear line 264, then, as dialing pulses arrive to the pulse detector on line 270, the output on line 268 will change into a low. When the dialing pulses stop, as for example at the end of a digit, the output on line 268 returns back to its high. However, when the clear signal on line 264 is low, then the output on line 268 always remains in its high state whether dialing pulses are present or not. The resistors 272, 274 and the capacitors 276, 278 are interconnected to the circuit chip, as is well known in the art, to determine the delay needed before the detector senses a missing pulse. For normal telephone use, the pulses repeat at a 10 cycle per second frequency and the resistors and capacitors would be set to detect any delay longer than that interval.

The output from the latch 252 has its inverse lines ABCD feeding NAND gate 280. The output from NAND gate 280 will therefore normally be in a low state. This low state feeds NAND gate 282 which has a normally high output. The high output from NAND gate 282 serves to hold the latch 252 along line 284. Also, it is used as a second clear signal on line 286 to the pulse detector 266. The output from this clear line appears on line 288 and the complement of line 288 appears on line 290. The output on line 288 will therefore normally be a high and the output on line 290 will normally be a low.

The operation of the dial pulse decoder shown in FIG. 10 is as follows. When a beep occurs, it resets the binary counter 244 on line 240 through NOR 242 and also sends a low pulse to the NAND gate 258 on line 294 to insure that its output will be a high, providing a high signal for the clear line 264 of the pulse detector 266 as well as for clearing the latch 246 and for holding the binary counter 250. Immediately after the reset pulse, the output from the NOR 242 returns to zero permitting the binary counter 244 to count the dialing pulses. As the dialing pulses enter, counter 244 will count them and as a result, some of the outputs on lines ABCD will become high. These high outputs will pass through the latch on the output lines ABCD of the latch and be sent to the binary-to-decimal decoder. The decoder 248 will convert these outputs to a digital value and those outputs will be low values on the output lines 292.

At the same time, some of the inverse outputs from the latch 246 will now be a low value, whereby the output from NAND 256 will now become a high. Line 294 will also be a high once the reset pulse has passed. However, NAND 258 will remain with a high output until the pulse detector senses an end of the dialing pulses. At that time, the output on line 268 will become a high so that the output from NAND 258 will now become a low.

The low output from NAND 258 will latch the value counted by the binary-to-decimal decoder by sending a low signal to the latch 260. Also, it will now permit the binary counter 262 to count. At the same time, the low signal on clear line 264 to the pulse detector will insure that the output 268 will remain at a high value even when subsequent dialing pulses are entered. As a result, the first digit dialed will now be decoded and will remain at the output 292 of the decoder 248.

As the caller dials the second digit, the binary counter 250 will now receive the dialing pulses. Some of the outputs ABC or D will now become high which will cause some of the inverse outputs ABCD from latch 252 to become low. As a result, the output from NAND 280 will now become a high. The second input to NAND 282 along line 296 comes from the output of NAND 256 and is now a high. However, as long as dialing pulses are entering the pulse detector 266, the output on line 288 will remain low. When the second digit has been completed, the pulse detector will detect the end of the second digit and the output on line 288 will now return to its high state. This will then cause the output from NAND 282 to become a low which will serve to lock the digits in the latch at 284 so that the binary-to-decimal decoder 254 can decode the second digit dialed. The output from the decoder will be low signals at the output lines 298. The output from NAND 282, now being a low, will also serve to make the clear signal on line 286 into a low value which will insure that the output on line 288 is a high. At the same time, since line 290 has the complement to the signal on line 288, after the second digit has been dialed and line 288 is maintained in a high state, line 290 will be maintained in a low state. The low signal on line 290 is utilized as a signal indicating that the complete case has been dialed. The output of the NAND gate 282 on line 300 will be used as a signal that second digit has been dialed. The output from the two binary-to-digital decoders 248, 254, will be applied to the code selector as the dialer code number.

The decoder shown in FIG. 10 is responsive to dialing pulses from a rotary dialer telephone unit. However, should the caller have a Touch-Tone telephone, the decoder shown in FIG. 11 will be operative to decode the telephone numbers dialed. The Touch-Tone signals will enter on line 302 and pass through the blocking capacitor 304. They will then feed a plurality of parallel frequency detectors 306, which can typically be phase locked loop circuits, each having a resistor 310 and a capacitor 308 arranged in its circuit to detect a specific frequency. As is well known, in the Touch-Tone system, each digit depressed on the Touch-Tone telephone will cause two discrete frequencies to be generated. The series of parallel frequency detectors each have a normally high output on line 312. When the frequency detector detects the specific frequency to which it is tuned, its output line will become low.

The output from the frequency detectors pass through a series of OR gates 314 which serve as the frequency decoders. The input to each OR gate contains two outputs from respective phase lock loops. Thus, for example the uppermost OR gate 314 has its input tied to the uppermost phase locked loop and the third phase locked loop. Typically, these two phase locked loops would detect frequencies of 697 hz. and 1209 hz. respectively, which together form the combination of frequencies representing a dialed number 1. In a similar manner, each of the other OR gates 314 have two specific input frequencies, whereby the output from the OR gates 314 will represent digital dialed numbers 1 through 8, as indicated.

The output from the OR gates 314 are connected to a first set of latches 316A and 316B and to a second set of latches 318A and 318B. The second set of latches 318A and 318B are connected through another set of OR gates, 320.

Typically, the latches 316A and B, 318A and B can be integrated circuit chips 7475. The outputs from these latches are normally high levels on each of the lines 1 through 8. The outputs from the latches respectively pass to the NAND gates 322 and 324 which can typically be integrated circuit chips 7430 which are actually 8 input NAND gates. The output from NAND gate 322, on line 326, feeds NAND gate 328. The other input to the NAND gate 328 is the reset signal generated at the occurrence of the beep following the end of the outgoing message. The output from the NAND gate 324, on line 330, feeds NAND gate 332 whose other input is also the reset signal. The series of OR gates 320 are enabled by means of the decode-second-digit signal on line 334 which comes from the end-of-digit detector, to be hereinafter described in FIG. 12.

Figure 11:
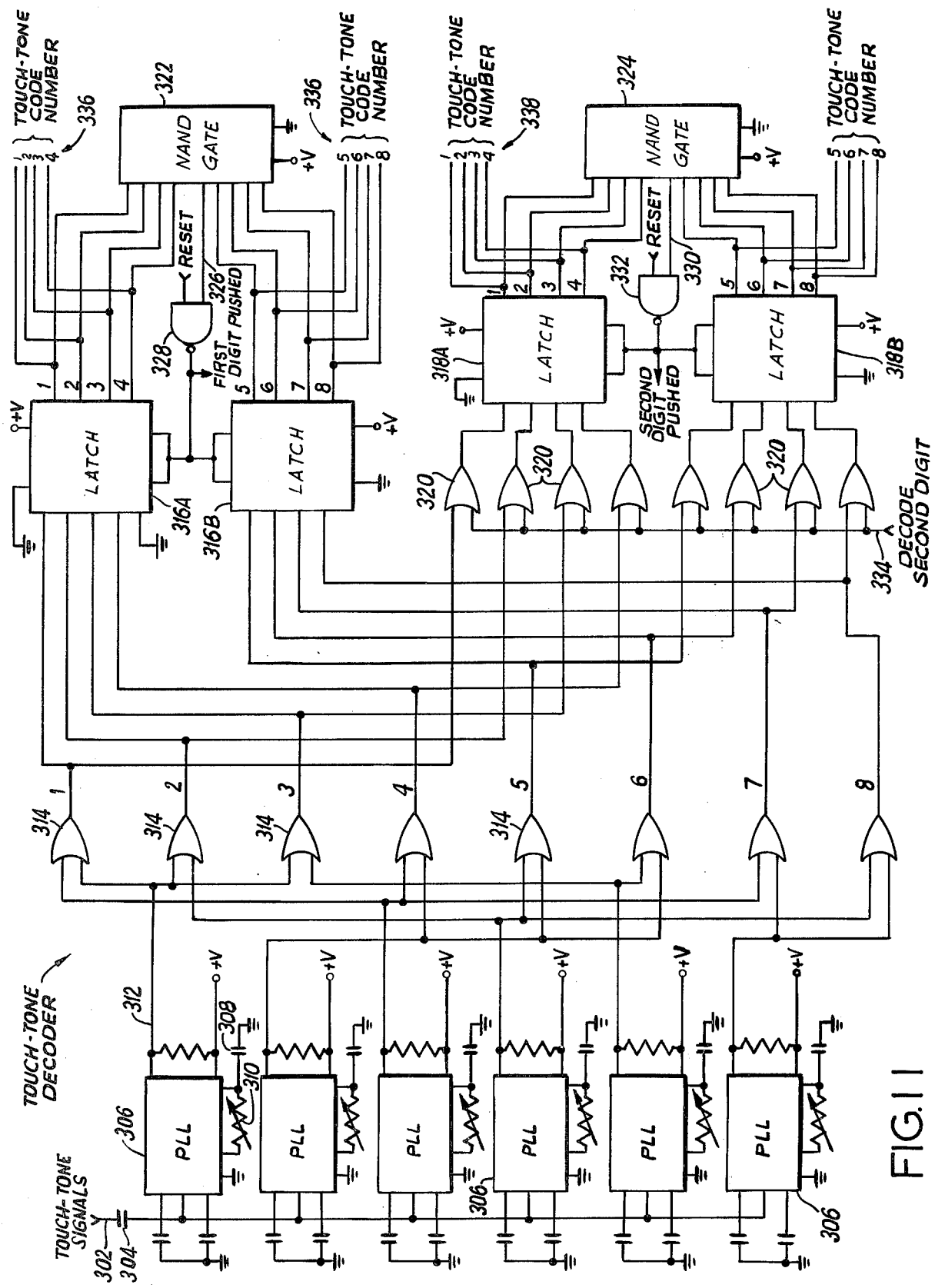
FIG. 11 is a circuit diagram showing the Touch-Tone decoder system.

The operation of the circuit shown in FIG. 11 is as follows. Normally, the outputs from the latches 316A and B and 318A and B are all high, whereby the outputs from the NAND gates 322 and 324 will be a low signal. At the occurrence of the beep, there occurs a low pulse whereby the output from NAND gates 328 and 332 will both be a high signal. This will clear the latches and reset them to latch the new signals. After the reset pulse, the reset input to NAND gates 328 and 332 will again go to its normally high level. However, since the output from the NAND gates 322 and 324 will still be a low, the latches will be maintained in an operating state.

When a digit is dialed on the Touch-Tone telephone used by the caller, the signals corresponding to the dialed digit will be detected by the frequency detectors 306. The two frequency detectors which produce low output signals will be decoded by causing the output from one of the OR gates 314 to become low. This OR gate will feed both sets of latches 316 and 318. However, since the decode-second-digit on line 334 will be a high, all of the OR gates 320 will be blocked. Therefore, only the first set of latches 316A and B will latch the first arriving digit.

The latches 316A and B will then latch the particular number which has been depressed on the Touch-Tone telephone and the respective output lines from the latches 316A and B will become low. As soon as one of these lines become low, the input to NAND gate 322 becomes a low and the output of the NAND gate 322 on line 326 becomes a high. Since the reset line is now also a high, the output from the NAND 328 will now become a low signal. This low will lock the decoders and prevent them from decoding any further. The low signal from NAND 328, indicating that a first digit was dialed, will also be sent to the end-of-digit-detector as will hereinafter be explained. The output from the latches 316A and B will appear on line 336 as the first digit of the Touch-Tone code number.

Assuming that two digits are being utilized to determine the code, an end-of-digit detector will determine that the first digit has been dialed, and in response thereto, produce a low signal on line 334 which will now enable OR gates 320. When the next Touch-Tone number has been dialed, the frequency detectors 306 will again determine the frequencies making up that signal and cause the respective decoding OR gates 314 to send a low signal to the OR gate 320 corresponding to that number. The selected OR gate 320 will then pass a low signal to the latches 318A and B which will cause one of the output lines from the latch to become low which causes the output 330 from the NAND gate 324 to become a high. Since the reset signal is now also high, NAND 332 will produce a low output signal which will lock the latches 318A and B to retain the number decoded. The low signal from NAND 332, indicating a second digit has been dialed will also be available for further use, as will hereinafter be explained. The outputs from the latches 318A and B on lines 338 will be available for the code selector indicating the second number of the Touch-Tone code number.

The end-of-digit detector 110 for the Touch-Tone decoder is shown in FIG. 12. The detector circuit 340 can typically be an integrated circuit chip 555. The output appears on line 342 and is normally high. When the clear signal on line 344 is high, the detector will sense incoming signals at its input on line 346 and at the presence of an input signal, will cause the output 342 to become a low. However, when the clear line 344 is a low, the output on line 342 will be locked into its high state.

Immediately after the beep is detected at the end of the outgoing message, the reset pulse on line 348 provides a low pulse which causes a high output from NAND gate 350 and a low output from NAND gate 352. The decode-second-digit signal 334 will then be a high which will be used to block the OR gate 320 (FIG. 11) and only permit a first digit to be decoded.

When Touch-Tone signals arrive on line 354, they are filtered and amplified by the amplifier 356 and shaped through the OR gate 358 and transistor 360 to provide an input signal to the detector 340. The output on line 342 will therefore turn low as long as the Touch-Tone signals are present.

When the first set of latches 316A and B (FIG. 11) have latched a number, the first-digit-pushed signal on line 362 will become a low. The two low inputs to the OR gate 364 will produce a low output. Since the low reset pulse is no longer present, the input to gate 350 will now be a high so that the output from NAND gate 352 will be a high and the output from NAND gate 350 will now be a low. This low output from NAND gate 350 also serves as the decode-second-digit signal and now enables the OR gates 320 to permit the second set of latches 318A and B to latch the second digit. At the same time, the output from NAND gate 350 also sets the clear input 344 to the detector 340 at a low value so that the output on line 342 is held at a high value and the detector will not be effected by further digits arriving.

Utilizing the circuits of FIGS. 11 and 12, when Touch-Tone signals arrive, the first two frequencies representing the first dialed digit will be decoded into a first Touch-Tone code number. The end-of-digit detector will then sense the end of the first digit and will enable the second series of latches 318A and B to latch the second pressed digit.

Figure 13:
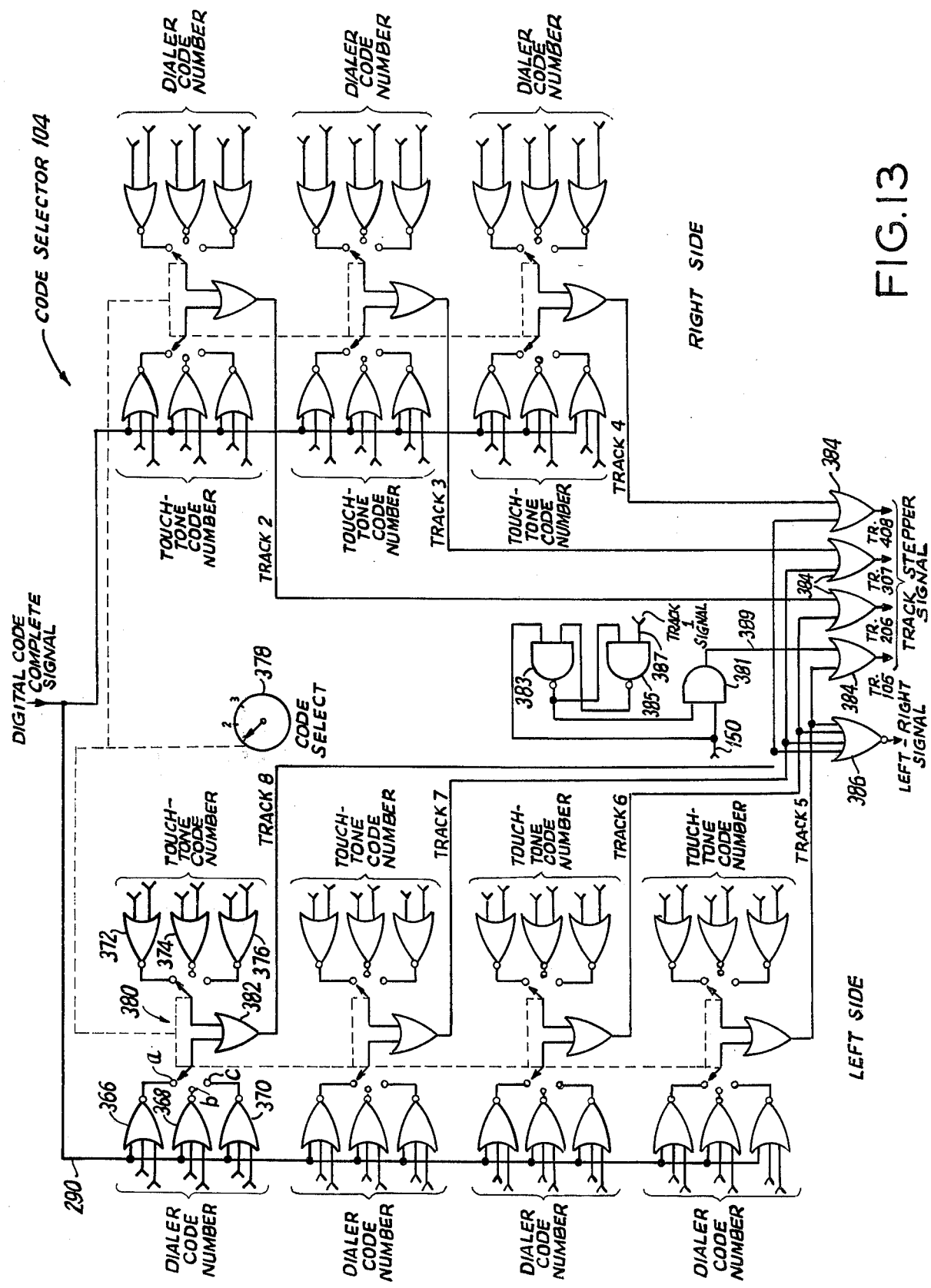
FIG. 13 is a circuit diagram showing the code selector circuit.

Referring now to FIG. 13, there will be described the circuit of the code selector 104. The code selector accepts the decoded numbers from both the dial pulse decoder of FIG. 10 as well as the decoded numbers from the Touch-Tone decoder of FIG. 11, and converts them to a signal identifying a particular track to be selected. Since the first track of the 8-track tape is automatically reserved for the standard outgoing message, only 7 additional tracks can be selected. In a standard 8-track system there are actually four levels of tracks and each track has a dual-channel for the right and left amplifiers. By separating the right and left channels, it is possible to obtain 8 individual tracks for recording, while utilizing a four level tape. There are therefore seven individual code select units for the 7 tracks, numbered track 2 through track 8, remembering that track 1 is automatically selected at the beginning of the answering. The right side contains tracks 2-4 and the left side has trackks 5-8.

With reference now to the circuit associated with track 8, it will be noted that three NOR gates 366, 368, 370 are available to receive the code numbers from the dial pulse decoder, and three NOR gates 372, 374, 376 are available to receive the signals from the Touch-Tone decoder. A central code select switch 378 is mechanically coupled to individual switches 380 at each unit, whereby one of the three dialer gates 366, 368 or 370 will be selected and one of the three Touch-Tone gates 372, 374 or 376 will be selected.

Each of the NOR gates has "hard wired" to its input specific lines representing specific code numbers. For example, the gate 366 can have as its input the number "24"; the gate 368 can have as its input the number "76" and the gate 370 can have as its input the number "17". By placing the code select switch so that terminal a is contacted, anytime the caller dials the code "24", track 8 will be selected. By placing the code select switch in position b, anytime the caller dials the number "76" the same track 8 will be selected, and when placed in position c, anytime the caller dials the code "17" track 8 will be selected. As is understood, the three gates 372, 374 and 376 accepting the Touch-Tone signals will have to be set in the same correspondence as the respective gate accepting the pulses from the dial pulse decoder, since it is not known whether the caller will be using a rotary dial telephone or a Touch-Tone telephone. The input to each NOR gate will be two low level signals and the output from the NOR gates will be a high level signal. The NOR gates accepting the dialer code numbers are initially enabled by the digital-code-complete-signal 290 which is generated by the pulse detector 266 on the decoder shown in FIG. 10. In this manner, only after both first and second digits have been dialed will the NOR gates be enabled. The high output from the selected NOR gate will pass through the OR gate 382 which will then send a signal identifying track 8. This signal will pass through the OR gate 384.

As described, the tape contains four levels, with each level having a left and right channel. The first level contains tracks 1 and 5; the second level tracks 2 and 6; the third level tracks 3 and 7, and the fourth level tracks 4 and 8. Therefore, four separate gates 384 are provided, each one accepting the appropriate track stepper signals for one level. These track stepper signals will then be utilized to step the recording head placing it adjacent to the proper level. In addition, a separate signal is provided to indicate whether the left or right channel of that level should be utilized. Four of the tracks, tracks 5-8 are assigned to the left side and, accordingly, those track signals also pass through the NOR gate 386 to provide a signal that the left side channel is to be utilized rather than the right side.

Although the other code selection units for the other tracks have not been specifically explained, it will be understood that they all operate identically to the one described for track 8.

The selection of track 1 is accomplished by means of the "ON" signal on line 150 (FIG. 4) which is generated as soon as the telephone is seized. The "ON" signal passes through AND gate 381, whose other input is also normally high, to produce a high output on line 389 feeding gate 384 to cause the 8-track stepper to move the tape to track 1. When the track 1 is placed in communication with the telephone line, the normally high Track 1 signal on line 387 becomes a low and the output from NAND 385 becomes a high so that the output from NAND gate 383 becomes a low which turns off AND gate 381 and stops the stepper signal. As a result, upon answering the telephone, the "On" signal is generated which will cause a signal to pass through gate 384 and will cause the stepper circuit to place the first track in communication with the telephone line. However, by using the arrangement shown, it will prevent the stepper circuit from continuously restepping to track 1.

While three separate NOR gates have been shown for each track, it will be appreciated that if only a single preset code is desired for each track, only one gate for the dialer code number and one gate for the Touch-Tone code number need be provided for each track. At that same time, if more than three codes are desired, a corresponding number of gates would be utilized.

Furthermore, it is understood that the mechanical ganged switch 378 could be arranged such that each track is selected separately and thereby one switch can be in position a for that track, while a second switch for a different track could be in position b. The only condition being that no two numbers are utilized for more than a single track.

Figure 14:
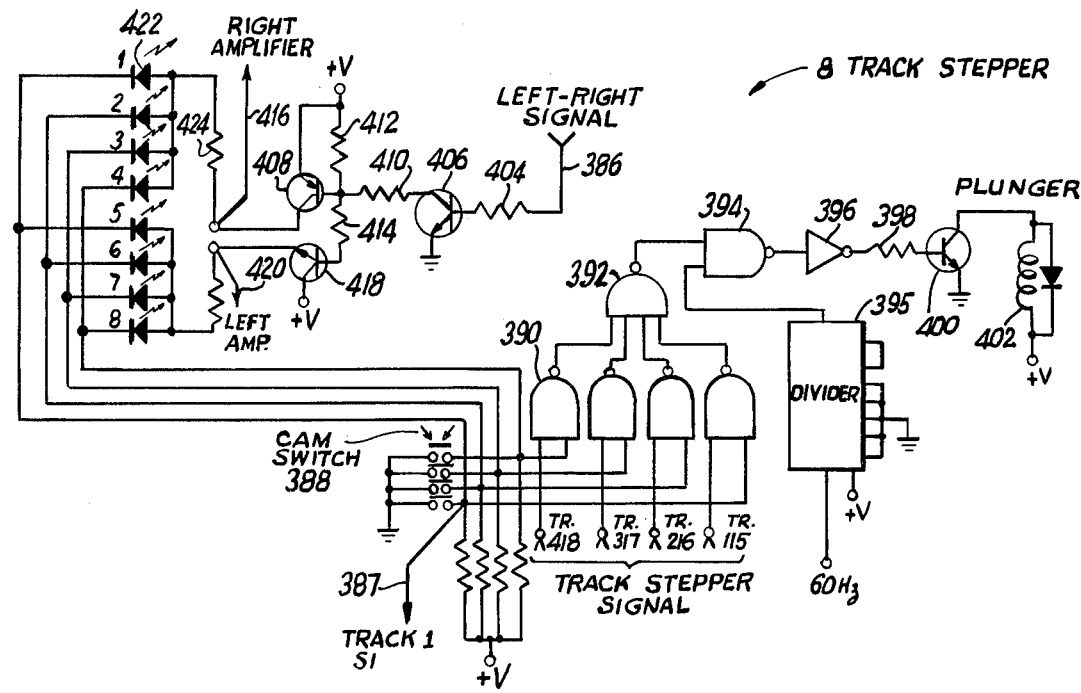
FIG. 14 is a circuit diagram showing the 8-track stepper circuit.

Referring now to FIG. 14 there is shown the 8-track stepper and channel selector. The typical 8-track recording device includes a mechanical cam switch which can be operated by a plunger to step it to each of its four levels. In the present embodiment, the cam switch 388 interconnects each of four NAND gates 390 to ground. Each of the NAND gates 390 receives a track-stepper signal representative of the layer in which the track selected is contained. Thus, the top level will contain tracks 4 and 8; the next lower level will contain tracks 3 and 7, the next level tracks 2 and 6 and the bottom most level will contain tracks 1 and 5. Similarly, a separate NAND gate 390 is provided for each of these layers. Normally, the cam switch is on one of its levels, whereby that level will automatically be connected to ground. Assuming for example, that the stepper-signal arrives at the gate indicating levels 4 and 8. Also, assume that the cam switch is in its bottom most position interconnecting gates 1 and 5. The input to the leftmost NAND 390 will therefore be a high representing the track 4 and 8 signal, and the other input to that NAND will also be high from the voltage source tV. Therefore, the output from the left most NAND 390 will be low, which will cause the output from NAND 392 to be a high which will enable NAND gate 394. A 60 cycle source is connected to divider circuit 395, typically an integrated circuit chip 7490, to provde output pulses of approximately 6 cycles per second. Each time one of the cycle pulses occurs, it will pass through NAND gate 394 to produce a low level output which is inverted by inverter 396 and fed through the base resistor 398 to turn on the transistor 400, thereby causing current to pass through the plunger coil 402 and step the cam switch to the next level. This procedure will continue until the cam switch is in a position to engage the level containing tracks 4 and 8. At that point, the other input to the left most NAND gate 390 will be grounded and be at a low level, whereby the output from that gate 390 will be a high causing the output from NAND gate 392 to be a low which then prevents the clock pulses from passing through the NAND gate 394 and transistor 400 will be turned off. As a result, the plunger will stop and the cam switch will remain positioned adjacent the desired level.

The right and left signal from line 386 (FIG. 13) is sent through the base resistor 404 to the transistor 406. Normally, line 386 is high whereby transistor 406 will be "on" which in turn turns "on" transistor 408 through the resistors 410 and 412. A signal is then present on line 416 to energize the right amplifier and play the right channel of whatever level is selected.

When a low signal appears on line 386, indicating tracks 5-8 have been selected, transistor 406 will turn "off" which in turn will turn "on" transistor 418 through resistors 412 and 414 which will now send a signal to the left amplifier on line 420 to energize the channel on the left side of whatever level has been selected.

At the same time as energizing the right and left amplifiers, light emitting diodes 422 are available for indicating specifically which channel has been selected. The light emitting diodes representing tracks 1-4, associated with the right channel, will be energized when transistor 408 is turned "on" by current passing through resistor 424 and the light emitting diode whose other end has been grounded through the cam switch 388. Thus, when the right amplifier is selected, light emitting diodes 1-4 are capable of being energized. However, assuming that track 1 is the one selected, only that diode will be grounded through the cam switch and only that diode will be energized. In a similar manner, when the left channel has been selected for tracks 5-8, the associated light emitting diode will be energized. The light emitting diodes are available on the front of the telephone answering apparatus, as is shown in FIG. 1, and provide an indication of exactly which track has been selected.

Figure 15:
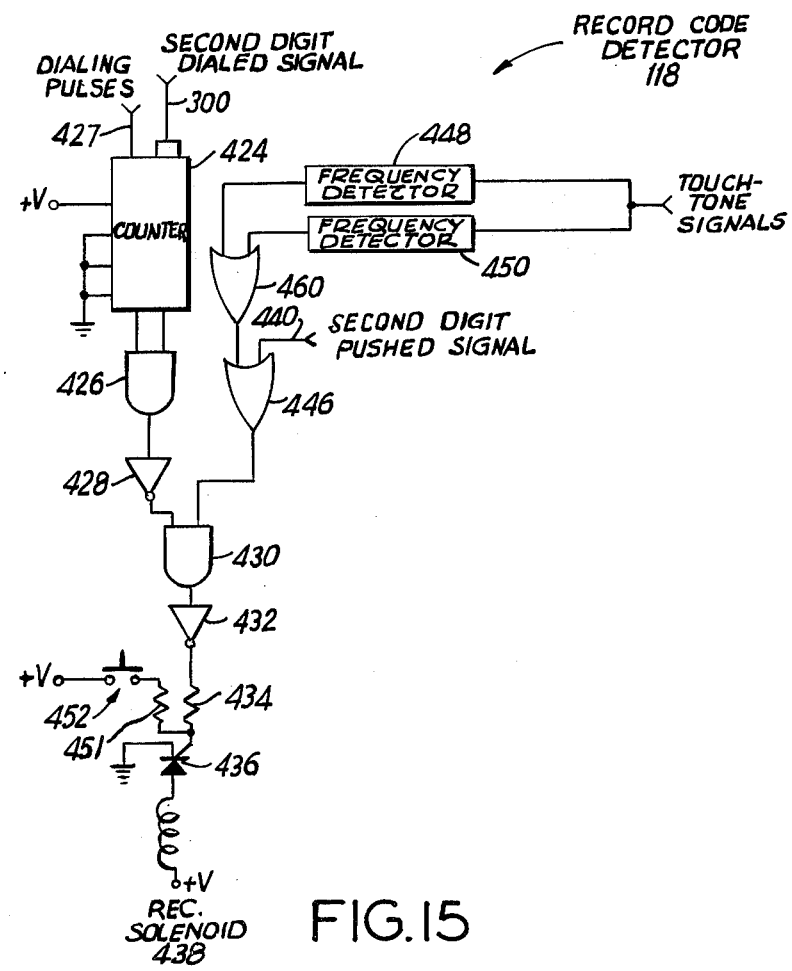
FIG. 15 is a circuit diagram of the record code-detector.

Up until now the circuits have described how a caller can, upon hearing the beep signal, dial a particular code and cause the associated track to be selected which will play an outgoing message onto the telephone line. However, should the owner, or the caller, wish to record on that track, he can do so by entering an additional code after the first two code digits have been dialed. Referring now to FIG. 15 there is shown the record-code-detector circuit 118 which responds to a third digit being dialed. If the caller is using a rotary dialer producing pulses, after the second digit is dialed, a signal will appear on line 300 (FIG. 10). This signal will be a low level signal indicating that a second digit has already been dialed. This signal will now energize the counter 424 which will be able to count incoming dialing pulses on line 427. The counter can typically be an integrated circuit chip 7490. The counter can be preset to respond to any preselected digit which will be indicative of changeover from playback to record. For example, the digit 9, when dialed as a third digit, can be utilized to indicate changeover from playback to record. Any other digit dialed as the third number will not have that effect.

Assuming that after the second digit dialed, a number 9 is dialed on a rotary dialer, the counter 424 will produce an output which will be a high level which will cause the AND gate 426 to also have a high output. The high will be inverted by inverter 428 to produce a low level at the input to AND gate 430 which will cause the output of AND gate 430 to be a low, and after inversion by inverter 432 it will send a high pulse through resistor 434 to the gate of the SCR 436, thereby energizing it and permitting current to pass through the record solenoid 438 to changt the mode of the 8-track from playback to record.

Should the caller be utilizing a Touch-Tone telephone, after the second digit has been pushed, the output indicating that the second digit has been pushed will be a low signal (FIG. 11). This will appear on line 440 to enable OR gate 446. Two frequency detectors 448, 450 are connected to an OR gate 460 and each receives the Touch-Tone signals. When the Touch-Tone signals representing a predetermined code, for example 9, is pushed as a third digit, the two frequency detectors 448 and 450 will produce low output signals such that the OR gate 460 will also have a low output, and combined with the low output from line 440 will produce a low output from gate 446. This will then produce a low level from AND gate 430 which will be inverted to a high level and again will trigger the SCR to cause the solenoid to change operation from playback to record mode. A manual switch 452 is also provided which will give the owner the manual capbility of changing the operation to record by having the voltage pass through the resistor 451 to also energize the SCR.

It will be appreciated that while heretofore there has been described particular circuits for carrying out the embodiments of the present invention, it will be understood that changes and modifications can be made to the circuits and these circuits are only illustrative to show the feasibility of the present invention. Furthermore, while an 8-track tape has been described, it is understood that other type tracks with different number tapes could also be utilized, with only slight modification to the circuit.

Instead of using separate dial pulse decoders and Touch-Tone frequency decoders independently feeding the code selector, it is also possible to use the dial pulse decoders and connect the decoded pulses to Touch-Tone frequencies which then feeds these frequency signals to the Touch-Tone decoder which in turn feeds the code selector. Touch-Tone frequencies which are dialed can then be fed directly to the Touch-Tone decoder which feeds the code selector. In this way only a single set of input gates must be provided to the code selector.

There has heretofore been described the best embodiment of the invention presently contemplated. However, it is to be understood that various changes and modifications may be made thereto without departing from the spirit of the invention.

What is claimed is:

1. In a telephone answering apparatus for interconnection to a telephone line comprising coupling means for seizing the telephone line in response to an incoming telephone call and recording means operatively communicating with said telephone line through said coupling means for recording and playing back messages, the improvement comprising decoding means interconnected to said telephone line through said coupling means for decoding numbers entered onto said telephone line by the caller after the recording means is in communication with said telephone line, recording control means responsive to the numbers decoded for controling the operation of said recording means, and recording means comprising means for recording and playing back a plurality of recording tracks, recording-mode-signal-detecting means coupled between said decoding means and said recording means for detecting a particular decoded number entered onto the same telephone line as is seized, and in response thereto switching said recording means to a record mode, whereby incoming messages can be recorded on the particular track selected, wherein said recording control means further includes track selecting means for selecting a particular one of the recording tracks corresponding to the number decoded whereby that track is placed in communication with the telephone line, wherein the recording medium includes a plurality of recording levels, each level having a left and right audio channel, and wherein said recording means further comprises right and left audio-channel-selectors responsive to said decoded number for selecting the audio channel corresponding to the decoded number.

2. The telephone answering system as in claim 1, and wherein said decoding means comprises first means responsive to digital dialed numbers, and second means responsive to Touch-Tone generated numbers.

3. The telephone answering system as in claim 1, and further comprising additional recording means interconnected with the telephone line through said coupling means for recording incoming messages from the telephone line.

4. The telephone answering system as in claim 3, and wherein an outgoing message is recorded on one of the recording tracks, and wherein said recording control means comprises track selection means responsive to the line being seized for playing the outgoing message from said one track onto the telephone line, said additional recording means being operative only after the termination of the outgoing message.

5. A telephone answering system for interconnection to a telephone line comprising: coupling means for seizing the telephone line in response to an incoming telephone call; first recording means operatively connected to said coupling means for playing an outgoing message onto the telephone line after the line is seized; second recording means responsive to the conclusion of said outgoing message and thereafter recording an incoming message from the telephone line; control means interconnecting both of said recording means with said coupling means for releasing the telephone line only after both recording means have concluded their respective operations; said first recording means comprising means for recording and playing back a plurality of recording tracks, said outgoing message being recorded on one of said tracks; decoding means interconnected to the telephone line through said coupling means for decoding numbers entered on the telephone line by the caller after the conclusion of said outgoing message; track selection means coupled to said decoding means for selecting a particular one of the recording tracks corresponding to the decoded number, whereby that track is placed in communication with the telephone line and any message recorded on the selected track is placed onto the telephone line; said decoding means further comprising first detector means coupled to the telephone line for detecting a first number entered onto the telephone line by the caller, first latching means coupled to said first detector means for retaining the number which has been dialed, end-of-digit-detector means coupled to said first latching means and producing an end-of-digit signal when said first number has been entered, second detector means coupled to the telephone line for detecting a second number entered by the caller, and second latching means coupled to said second detector means for retaining the number detected by said second detector, said second detector means being enabled by said end-of-digit signal, and wherein said second latching means provides an end-of-a second-digit signal, and further comprising recording-mode-signal means enabled by said end-of-a-second-digit signal and responsive to a subsequently predetermined number entered by the caller for switching said first recording means to a record mode, whereby incoming messages can be recorded on the particular recording track selected.

6. The telephone answering system as in claim 5, and wherein said decoding means can accommodate the presence of pulses on the line from a rotary dialer, as well as frequency signals on the line from a Touch-Tone generator.

7. The telephone answering system as in claim 5, and further comprising presettable code determining means interconnected between said decoding means and said track selection means for determining the correspondence between the numbers entered by the caller and the particular track associated with that number.

8. The telephone answering system as in claim 7, and wherein said code determining means includes a plurality of gating means interconnected in parallel between said decoding means and said track selection means, each of said gating means being opened by a different entered number, and switch means for enabling particular ones of said plurality of said gating means.

9. The telephone answering system as in claim 5 and wherein said decoding means further comprises a frequency detector means coupled to the telephone line for determining the frequencies of the signal appearing on the line as a Touch-Tone number is generated by the caller; said first detector means comprises a first frequency decoder means coupled to said frequency detector means for converting the frequencies detected into a corresponding dialed number, said first latching means being coupled to said first frequency decoder means for retaining the number converted by said frequency decoder after a first Touch-Tone number has been generated, said end-of-digit detector means being coupled to both said coupling means and to said first latching means and producing said end-of-digit signal when a first Touch-Tone number has been generated, said second detector means comprises a second frequency decoder means coupled to said frequency detector means for converting the frequency detected into a corresponding number dialed, said second latching means being coupled to said second frequency decoder means for retaining the number converted by said second frequency decoder means after a second Touch-Tone number has been generated, and wherein said second frequency decoder means is enabled by said end-of-digit signal.

10. The telephone answering system as in claim 9, and wherein said frequency detector means comprises a plurality of phase locked loops connected in parallel to each other, each capable of detecting one of the frequencies of a Touch-Tone generating system.

11. The telephone answering system as in claim 9, and further comprising gating means coupled between said end-of-digit means and said second latching means, said end-of-digit signal being applied to open said gating means, thereby permitting said second frequency decoder to count the frequency detected by said frequency detector means.

12. The telephone answering system as in claim 10, and wherein said decoding means further comprises:
   (a) first counter means coupled to the telephone line for counting the number of pulses appearing on the line as a number is dialed by the caller;
   (b) end-of-digit detector means coupled to the telephone line for detecting the end of a digit dialed by the caller;
   (c) first latching means interconnected between said end-of-digit-detector means and said counter means for retaining the number of pulses on said first counter means upon detection of an end of a digit, and
   (d) first pulse-decoder means coupled to said latching means for decoding the number of pulses retained.

13. The telephone answering system as in claim 12, and wherein said end-of-digit detector includes a pulse-detector and a delay network coupled thereto, whereby said pulse-detector can determine the absence of a pulse from a predetermined series of periodic pulses.

14. The telephone answering system as in claim 12, and wherein said decoding means further comprises:
   (a) second counter means coupled to the telephone line for counting the number of pulses appearing on the line as a number is dialed by the caller;
   (b) second latching means interconnected between said end-of-digit detector means and said counter means for retaining the number of pulses on said second counter means upon detection of the end of a digit;
   (c) second pulse decoder means coupled to said second latching means for decoding the number of pulses retained; and
   (d) wherein said end-of-digit detector means responds to the conclusion of the outgoing message to provide a first enabling signal to said first latching means whereby said first counter can count the pulses of a first dialed digit, and said end-of-digit detector means responds to the end of a first digit dialed to provide a second enabling signal to said second latching means whereby said second counter means can count the pulses of a second digit dialed.

15. The telephone answering system as in claim 14, and wherein said second latching means provides an end-of-a-second-digit signal, and further comprising record-detecting means enabled by said end-of-a-second-digit signal and responsive to a predetermined dialed digit, for switching said first recording means to a record mode, whereby incoming messages can be recorded on the particular recording track selected.

16. A telephone answering system for interconnection to a telephone line comprising: coupling means for seizing the telephone line in response to an incoming telephone call; first recording means operatively connected to said coupling means for playing an outgoing message onto the telephone line after the line is seized; second recording means responsive to the conclusion of said outgoing message and thereafter recording an incoming message from the telephone line; control means interconnecting both of said recording means with said coupling means for releasing the telephone line only after both recording means have concluded their respective operations; said first recording means comprising means for recording and playing back a plurality of recording tracks, said outgoing message being recorded on one of said tracks, said first recording means accommodating a plural-level recording medium, each level having a left and right audio channel to thereby obtain a separate track respectively therefrom, whereby said plurality of recording tracks are obtained by the forming of two tracks for each respective level corresponding to the left and right audio channels of each level; said second recording means comprises means for playing a standard cassette recording medium; decoding means interconnected to the telephone line through said coupling means for decoding numbers entered onto the telephone line by the caller after the conclusion of said outgoing message: and track selection means coupled to said decoding means for selecting a particular one of said recording tracks corresponding to the decoded number, whereby that track is placed in communication with the telephone line and any message recorded on the selected track is played onto the telephone line.

17. The telephone answering system as in claim 16, and further comprising recording-mode-signal-detecting means coupled between said decoding means and said first recording means for detecting a particular decoded number and in response thereto switching said first recording means to a record mode whereby incoming messages can be recorded on the particular recording track selected.

18. The telephone answering system as in claim 16, and further comprising housing means containing a first opening through which said plural-level recording medium can be inserted, and a second opening through which said standard cassette recording medium can be inserted, and wherein said housing means is coupled to a telephone handset.

19. The telephone answering system as in claim 16, and wherein said outgoing message includes a concluding tone, and wherein said first recording means includes a first motor responsive to the seizing of the telephone line for operating said plural-level recording medium, and said second recording means includes a tone detector responsive to the concluding tone, and a second motor coupled to said tone detector for operating said standard cassette recording medium after the detection of the concluding tone.

20. The telephone answering system as in claim 19, and wherein said second recording means further comprises voice detection means responsive to the presence of incoming messages from the telephone line which are being recorded by the second recording means, and delay means coupled to between said voice detection means and said second motor for maintaining said second motor in operation during the presence of incoming messages and for stopping said second motor a predetermined time after the termination of an incoming message.

21. The telephone answering system as in claim 20, and wherein said first recording means further comprises, sensing means for detecting a predetermined point on the plural-level recording medium and in response thereto stopping said first motor, and wherein said control means further comprises means for releasing the telephone line in response to the stopping of the operation of both said first and second motors.

22. The telephone answering system as in claim 16, and wherein said track selection means comprises switch means for placing one of the recording levels in operative communication with the telephone line, and stepping means responsive to the decoded numbers for stepping said switch means until it places the particular one of said recording levels into operative communication with the telephone line.

23. The telephone answering system as in claim 22, and wherein said stepping means includes a plurality of gating means coupled between said decoding means and said switch means, each of said gating means enabled by a particular decoded number for passing stepping signals to said switch means until said switch means positions the recording level corresponding to said decoded number in operative communication with the telephone line.

24. The telephone answering system as in claim 22 and wherein said first recording means further comprises right and left audio-channel-selector responsive to said decoded number for selecting the audio channel corresponding to the decoded number.

25. The telephone answering system as in claim 24, and wherein said track selection means further comprises display means for displaying both the particular recording level selected as well as the audio channel selected.

26. The telephone answering system as in claim 25, and wherein said display means includes two photoluminescent devices for each level, one of which represents the right channel of the level and the other of which represents the left channel of the level.

* * * * *